(12) United States Patent
Imaeda et al.

(10) Patent No.: US 11,894,188 B2
(45) Date of Patent: Feb. 6, 2024

(54) MULTILAYER CAPACITOR

(71) Applicant: TDK CORPORATION, Tokyo (JP)

(72) Inventors: Takuya Imaeda, Tokyo (JP); Takashi Morita, Tokyo (JP); Masashi Hatanaka, Tokyo (JP); Toshihiko Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 47 days.

(21) Appl. No.: 17/739,482

(22) Filed: May 9, 2022

(65) Prior Publication Data

US 2022/0384107 A1   Dec. 1, 2022

(30) Foreign Application Priority Data

May 27, 2021  (JP) ................................ 2021-089100

(51) Int. Cl.
*H01G 4/005* (2006.01)
*H01G 4/248* (2006.01)
*H01G 4/30* (2006.01)

(52) U.S. Cl.
CPC ............. *H01G 4/005* (2013.01); *H01G 4/248* (2013.01); *H01G 4/30* (2013.01)

(58) Field of Classification Search
CPC .......... H01G 4/30; H01G 4/248; H01G 4/005; H01G 4/2325; H01G 4/008; H01G 4/0085; H01G 4/12; H01G 4/224; H01G 4/228; H01G 4/1218

See application file for complete search history.

(56) References Cited

U.S. PATENT DOCUMENTS

| | | | |
|---|---|---|---|
| 2006/0256504 A1 | 11/2006 | Kojima | |
| 2018/0374645 A1* | 12/2018 | Imai | H01G 4/385 |
| 2019/0221368 A1* | 7/2019 | Ono | H01G 4/30 |
| 2020/0152385 A1* | 5/2020 | Ishizuka | H01G 4/232 |
| 2022/0384114 A1* | 12/2022 | Mun | H01G 4/012 |

FOREIGN PATENT DOCUMENTS

JP   2006-332285 A   12/2006

* cited by examiner

*Primary Examiner* — Michael P McFadden
(74) *Attorney, Agent, or Firm* — Oliff PLC

(57) ABSTRACT

An element body of a multilayer capacitor has a plurality of first electrodes and a plurality of second electrodes. At least one of the first electrodes is curved such that a first main body portion is located on an outer side of a first extending portion in a first direction, and at least one of the second electrodes is curved such that a second main body portion is located on an outer side of a second extending portion in the first direction. The following expressions (1) to (6) are satisfied for lengths L0 to L4 in a second direction and distances TL1 to TL3 between main surfaces.

$$0.03 \leq L1/L0 \leq 0.1 \quad (1)$$

$$0.1 \leq L2/L0 \leq 0.25 \quad (2)$$

$$0.75 \leq L3/L0 \leq 0.9 \quad (3)$$

$$0.9 \leq L4/L0 \leq 0.97 \quad (4)$$

$$0 \leq (TL1-TL2)/TL1 \leq 0.02 \quad (5)$$

$$0 \leq (TL1-TL3)/TL1 \leq 0.02 \quad (6)$$

5 Claims, 3 Drawing Sheets

MULTILAYER CAPACITOR

TECHNICAL FIELD

The present disclosure relates to a multilayer capacitor.

BACKGROUND

For example, Japanese Patent Application Laid-open No. 2006-332285 describes a multilayer ceramic capacitor including a ceramic substrate and a plurality of internal electrodes. The plurality of internal electrodes are laminated inside the ceramic substrate at intervals in a thickness direction of the ceramic substrate and are alternately led out to both end portions of the ceramic substrate in a length direction thereof.

SUMMARY

A multilayer capacitor as described above is required to have a higher capacity and thinning and multi-layering thereof have been progressing. On the other hand, as the thinning and multi-layering progress, structural defects such as delamination are likely to occur. For this reason, it is required to inhibit occurrence of structural defects while increasing the capacity. In addition, a multilayer capacitor is also required to inhibit occurrence of mounting defects.

Therefore, an object of an aspect of the present disclosure is to provide a multilayer capacitor that makes it possible to inhibit occurrence of structural defects, increase a capacity, and inhibit occurrence of mounting defects.

A multilayer capacitor according to an aspect of the present disclosure includes an element body including a pair of main surfaces facing each other in a first direction, and a first side surface and a second side surface facing each other in a second direction perpendicular to the first direction, in which the element body includes a plurality of first electrodes and a plurality of second electrodes disposed alternately to face each other via dielectric layers in the first direction, each of the plurality of first electrodes includes a first main body portion and a first extending portion extending from the first main body portion to reach the first side surface, each of the plurality of second electrodes includes a second main body portion and a second extending portion extending from the second main body portion to reach the second side surface, in a cross-section parallel to the first direction and the second direction, at least one of the plurality of first electrodes is curved such that the first main body portion is located on an outer side of the first extending portion in the first direction and the at least one of the plurality of first electrodes includes a first curve-start point closest to the first side surface and a second curve-start point second closest to the first side surface after the first curve-start point, at least one of the plurality of second electrodes is curved such that the second main body portion is located on an outer side of the second extending portion in the first direction and the at least one of the plurality of second electrodes includes a fourth curve-start point closest to the second side surface and a third curve-start point second closest to the second side surface after the fourth curve-start point, when a length of the element body in the second direction is defined as $L0$, a distance between the first side surface and the first curve-start point in the second direction is defined as $L1$, a distance between the first side surface and the second curve-start point in the second direction is defined as $L2$, a distance between the first side surface and the third curve-start point in the second direction is defined as $L3$, a distance between the first side surface and the fourth curve-start point in the second direction is defined as $L4$, a distance between the pair of main surfaces on a straight line that is parallel to the first direction and passes through a center of the element body in the second direction is defined as $TL1$, a distance between the pair of main surfaces on a straight line that is parallel to the first direction and passes through the second curve-start point is defined as $TL2$, and a distance between the pair of main surfaces on a straight line that is parallel to the first direction and passes through the third curve-start point is defined as $TL3$, the following expressions (1) to (6) are satisfied.

$$0.03 \leq L1/L0 \leq 0.1 \tag{1}$$

$$0.1 \leq L2/L0 \leq 0.25 \tag{2}$$

$$0.75 \leq L3/L0 \leq 0.9 \tag{3}$$

$$0.9 \leq L4/L0 \leq 0.97 \tag{4}$$

$$0 \leq (TL1-TL2)/TL1 \leq 0.02 \tag{5}$$

$$0 \leq (TL1-TL3)/TL1 \leq 0.02 \tag{6}$$

In this multilayer capacitor, in the cross-section parallel to the first direction and the second direction, at least one of the first electrodes is curved such that the first main body portion is located on the outer side of the first extending portion in the first direction, and at least one of the second electrodes is curved such that the second main body portion is located on the outer side of the second extending portion in the first direction. In addition, the above expressions (1) to (4) are satisfied for the first to fourth curve-start points. In the multilayer capacitor configured in this way, deformation of a capacitance forming portion in a pressurizing step during manufacturing is inhibited, and an interlayer adhesion strength in a margin portion adjacent to the capacitance forming portion is increased, and as a result, occurrence of structural defects can be inhibited. Also, since a large size of the capacity forming portion can be secured, an increase in capacity can be achieved. Further, in this multilayer capacitor, the above expressions (5) and (6) are satisfied for the distance between the main surfaces. Thus, the main surfaces can be flattened and occurrence of mounting defects can be inhibited. Accordingly, according to this multilayer capacitor, it is possible to inhibit occurrence of structural defects, increase a capacity, and inhibit occurrence of mounting defects.

The at least one of the plurality of first electrodes may further include a first portion extending from the first main body portion to a side opposite to the first extending portion and may be curved such that the first main body portion is located on an outer side of the first portion in the first direction, and the at least one of the plurality of second electrodes may further include a second portion extending from the second main body portion to a side opposite to the second extending portion and may be curved such that the second main body portion is located on an outer side of the second portion in the first direction. In this case, occurrence of structural defects can be further inhibited.

Each of a pair of outermost electrodes located on the outermost side in the first direction among the plurality of first electrodes and the plurality of second electrodes may include a main body portion, and an extending portion extending from the main body portion to reach the first side surface or the second side surface, and when a distance between the main body portions of the pair of outermost electrodes in the first direction is defined as $T1$, and a distance between the extending portions of the pair of outermost electrodes in the first direction is defined as T2, the following expression (7) may be satisfied.

$$0.75 \leq T2/T1 \leq 0.94 \quad (7)$$

In this case, occurrence of structural defects can be further inhibited.

The element body may further include a third side surface and a fourth side surface facing each other in a third direction perpendicular to the first direction and the second direction, each of the plurality of first electrodes may further include a third extending portion extending from the first main body portion toward the third side surface, and a fourth extending portion extending from the first main body portion toward the fourth side surface, in a cross-section perpendicular to the second direction, at least one of the plurality of first electrodes may be curved such that the first main body portion is located on an outer side of the third extending portion and the fourth extending portion in the first direction and the at least one of the plurality of first electrodes may include a fifth curve-start point located at a boundary part between the first main body portion and the third extending portion, and a sixth curve-start point located at a boundary part between the first main body portion and the fourth extending portion, and when a length of the element body in the third direction is defined as W0, a distance between the third side surface and the fifth curve-start point in the third direction is defined as W1, and a distance between the third side surface and the sixth curve-start point in the third direction is defined as W2, the following expressions (8) and (9) may be satisfied.

$$0 \leq W1/W0 \leq 0.25 \quad (8)$$

$$0.75 \leq W2/W0 \leq 1 \quad (9)$$

In this case, it is possible to achieve a further increase in capacity while further inhibiting occurrence of structural defects.

In the cross-section perpendicular to the second direction, when a distance between the pair of main surfaces on a straight line that is parallel to the first direction and passes through a center of the element body in the third direction is defined as TW1, a distance between the pair of main surfaces on a straight line that is parallel to the first direction and passes through the fifth curve-start point is defined as TW2, and a distance between the pair of main surfaces on a straight line that is parallel to the first direction and passes through the sixth curve-start point is defined as TW3, the following expressions (10) and (11) may be satisfied.

$$0 \leq (TW1-TW2)/TW1 \leq 0.02 \quad (10)$$

$$0 \leq (TW1-TW3)/TW1 \leq 0.02 \quad (11)$$

In this case, occurrence of mounting defects can be further inhibited.

According to an aspect of the present disclosure, it is possible to provide a multilayer capacitor that makes it possible to inhibit occurrence of structural defects, increase a capacity, and inhibit occurrence of mounting defects.

DETAILED DESCRIPTION

Figure 1:
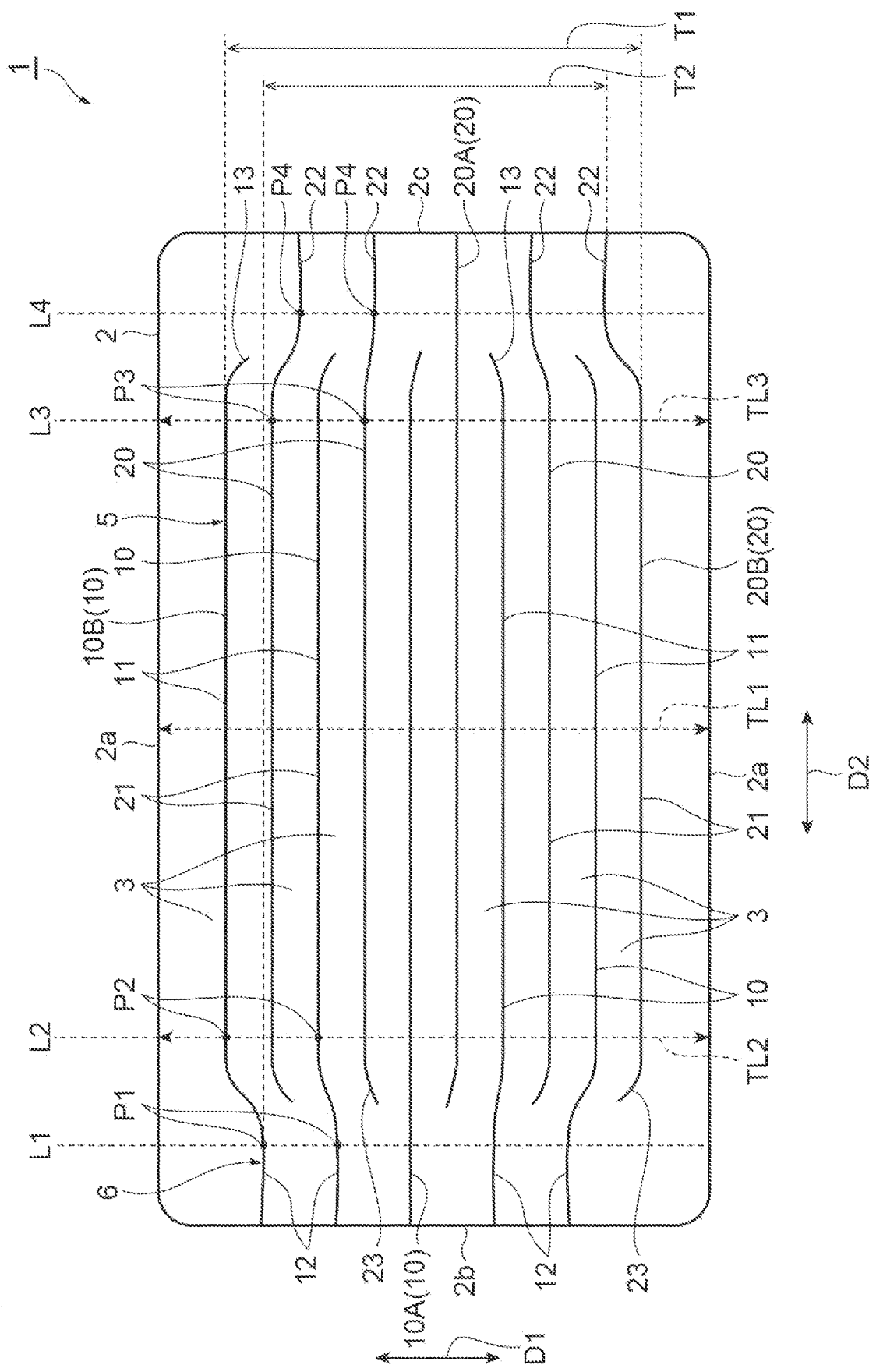
FIG. 1 is a cross-sectional view of a multilayer capacitor according to an embodiment.

Hereinafter, an embodiment of the present disclosure will be described in detail with reference to the drawings. In the following description, the same or equivalent elements will be denoted by the same reference numerals, and repeated description will be omitted.

Figure 2:
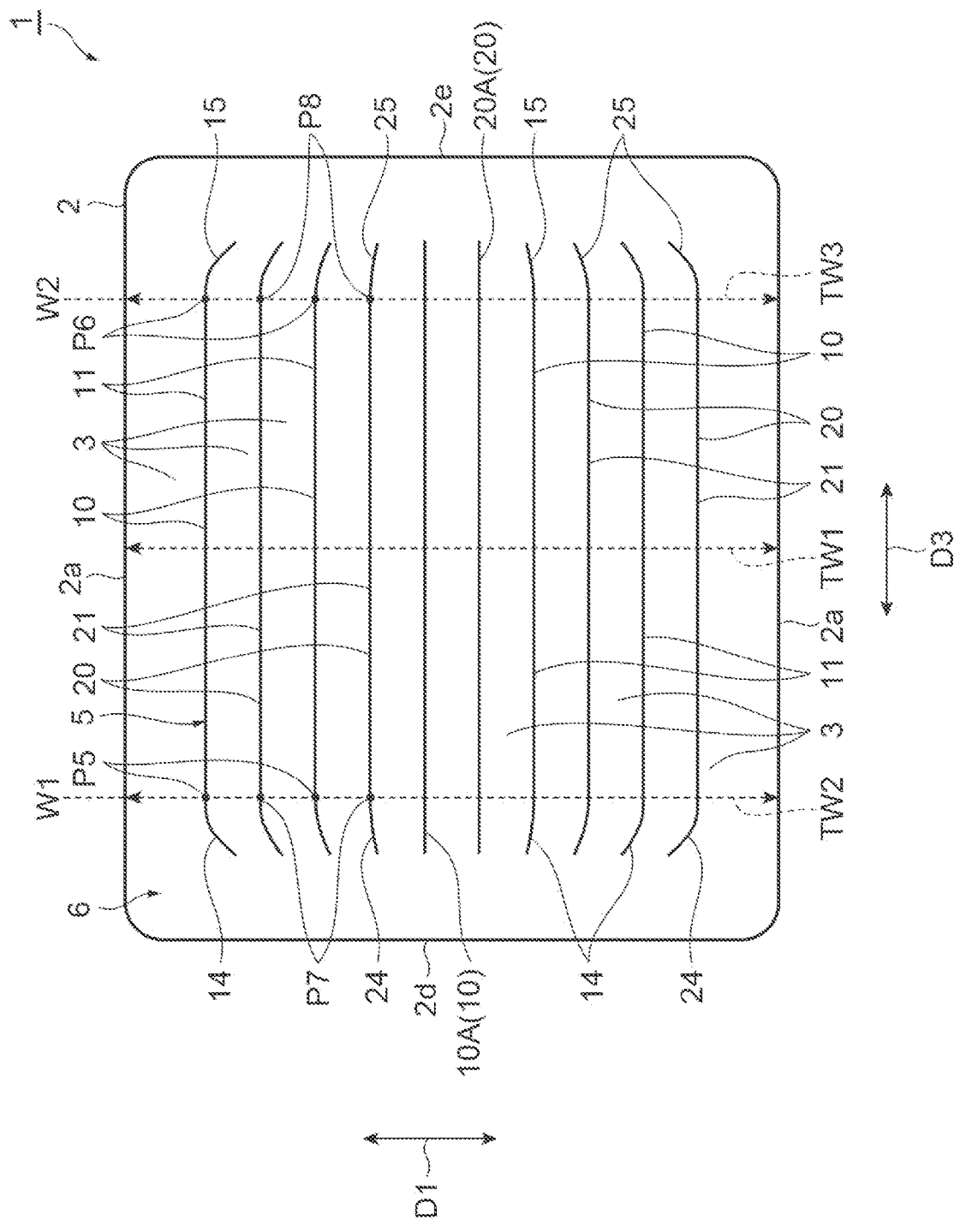
FIG. 2 is another cross-sectional view of the multilayer capacitor.

As shown in FIGS. 1 and 2, a multilayer capacitor 1 includes an element body 2. The element body 2 is formed in a substantially rectangular parallelepiped shape. Rectangular parallelepiped shapes include a rectangular parallelepiped shape in which corner portions and ridge portions are chamfered, and a rectangular parallelepiped shape in which corner portions and ridge portions are rounded. The element body 2 has a pair of main surfaces 2a, a first side surface 2b, a second side surface 2c, a third side surface 2d, and a fourth side surface 2e. The pair of main surfaces 2a face each other in a first direction D1. The first side surface 2b and the second side surface 2c face each other in a second direction D2 perpendicular to the first direction D1. The third side surface 2d and the fourth side surface 2e face each other in a third direction D3 perpendicular to the first direction D1 and the second direction D2. One main surface 2a constitutes a mounting surface. The multilayer capacitor 1 is mounted on a mounting target (for example, an electronic component, a substrate, or the like) by soldering at the one main surface 2a, for example.

FIG. 1 shows a cross-section of the multilayer capacitor 1 perpendicular to the third direction D3 (a cross-section parallel to the first direction D1 and the second direction D2), and FIG. 2 shows a cross-section of the multilayer capacitor 1 perpendicular to the second direction D2. The cross-sections of FIGS. 1 and 2 are, for example, cross-sections that pass through a center of the element body 2. In FIGS. 1 and 2, hatching for indicating a cross-section is omitted. The first direction D1, the second direction D2, and the third direction D3 are, for example, a height direction, a length direction, and a width direction of the element body 2, respectively. In this example, a length of the element body 2 in the second direction D2 is longer than a length (height) of the element body 2 in the first direction D1 and a length (width) of the element body 2 in the third direction D3. The length of the element body 2 in the first direction D1 and the length of the element body 2 in the third direction D3 may be equal to each other or different from each other.

The element body 2 has a plurality of dielectric layers 3, a plurality of first electrodes 10, and a plurality of second electrodes 20. Each of the dielectric layers 3 is made of, for example, a sintered body of a ceramic green sheet containing a dielectric material (a dielectric ceramic such as a $BaTiO_3$ system, a $Ba(Ti, Zr)O_3$ system, or a $(Ba, Ca)TiO_3$ system). In an actual element body 2, adjacent dielectric layers 3 are integrated to the extent that a boundary between them cannot be visually recognized.

The plurality of first electrodes 10 and the plurality of second electrodes 20 are alternately disposed to face each other via the dielectric layer 3 in the first direction D1. That is, the plurality of dielectric layers 3, the plurality of first electrodes 10, and the plurality of second electrodes 20 are laminated such that the first electrode 10, the dielectric layer 3, the second electrode 20, the dielectric layer 3, and the first electrode 10 are repeatedly arranged in order in the first direction D1. A pair of outermost layers in the first direction D1 are the dielectric layers 3. A laminating direction of the dielectric layers 3, the first electrodes 10 and the second electrodes 20 coincides with the first direction D1.

The first electrodes 10 and the second electrodes 20 are formed in a layer shape with a conductive material such as Ni or Cu. The first electrodes 10 and the second electrodes 20 are made of, for example, a sintered body of a conductive paste containing the conductive material. The first electrodes 10 and the second electrodes 20 function as internal electrodes disposed in the element body 2. The first electrodes 10 and the second electrodes 20 have different polarities from each other.

Shapes of the first electrodes 10 and the second electrodes 20 in the cross-section of FIG. 1 will be described with reference to FIG. 1. The element body 2 has a uniform cross-sectional shape in the third direction D3.

Each of the first electrodes 10 has a first main body portion 11, a first extending portion 12, and a first portion 13. The first main body portion 11 has, for example, a rectangular shape when viewed in the first direction D1. The first extending portion 12 extends from the first main body portion 11 to reach the first side surface 2b and is exposed on the first side surface 2b. The first extending portion 12 is electrically connected to an external electrode (not shown) that is provided on an outer surface of the element body 2 to cover the first side surface 2b. The first portion 13 extends from the first main body portion 11 to a side opposite to the first extending portion 12 toward the second side surface 2c. The first portion 13 is not exposed on the outer surface of the element body 2.

Each of the first electrodes 10 other than a first electrode 10A located at a center in the first direction D1 among the plurality of first electrodes 10 is curved at a boundary part between the first main body portion 11 and the first extending portion 12 such that the first main body portion 11 is located on an outer side of the first extending portion 12 in the first direction D1. In other words, each of those first electrodes 10 is curved such that the first extending portion 12 is located on an inner side of the first main body portion 11 in the first direction D1. The outer side and the inner side in the first direction D1 are an outer side and an inner side with respect to the center of the element body 2 in the first direction D1.

Each of the first electrodes 10 other than the first electrode 10A is curved as described above and thus has a first curve-start point P1 and a second curve-start point P2. The first curve-start points P1 are curve-start points closest to the first side surface 2b among curve-start points of the first electrodes 10 in the cross-section of FIG. 1, and the second curve-start points P2 are curve-start points second closest to the first side surface 2b after the first curve-start points P1.

Further, each of the first electrodes 10 is curved at a boundary part between the first main body portion 11 and the first portion 13 such that the first main body portion 11 is located on an outer side of the first portion 13 in the first direction D1. In other words, each of the first electrodes 10 is curved such that the first portion 13 is located on an inner side of the first main body portion 11 in the first direction D1.

Each of the second electrodes 20 has a second main body portion 21, a second extending portion 22, and a second portion 23. The second main body portion 21 is formed in a rectangular shape, for example. The second extending portion 22 extends from the second main body portion 21 to reach the second side surface 2c and is exposed on the second side surface 2c. The second extending portion 22 is electrically connected to an external electrode (not shown) that is provided on an outer surface of the element body 2 to cover the second side surface 2c. The second portion 23 extends from the second main body portion 21 to a side opposite to the second extending portion 22 toward the first side surface 2b. The second portion 23 is not exposed on the outer surface of the element body 2.

Each of the second electrodes 20 other than a second electrode 20A located at a center in the first direction D1 among the plurality of second electrodes 20 is curved at a boundary part between the second main body portion 21 and the second extending portion 22 such that the second main body portion 21 is located on an outer side of the second extending portion 22 in the first direction D1. In other words, each of the second electrodes 20 is curved such that the second extending portion 22 is located on an inner side of the second main body portion 21 in the first direction D1. The boundary parts between the second main body portions 21 and the second extending portions 22 overlaps the first portions 13 of the first electrodes 10 in the first direction D1.

Each of the second electrodes 20 other than the second electrode 20A is curved as described above and thus has a third curve-start point P3 and a fourth curve-start point P4. The fourth curve-start points P4 are curve-start points closest to the second side surface 2c among curve-start points of the second electrodes 20 in the cross-section of FIG. 1, and the third curve-start points P3 are curve-start points second closest to the second side surface 2c after the fourth curve-start points P4.

Further, each of the second electrodes 20 is curved at a boundary part between the second main body portion 21 and the second portion 23 such that the second main body portion 21 is located on an outer side of the second portion 23 in the first direction D1. In other words, each of the second electrodes 20 is curved such that the second portion 23 is located on an inner side of the second main body portion 21 in the first direction D1. The second portions 23 overlaps the boundary parts between the first main body portions 11 and the first extending portions 12 of the first electrodes 10 in the first direction D1.

The element body 2 has a capacitance forming portion 5 and a margin portion 6. The capacitance forming portion 5 is a portion in which the first electrodes 10 and the second electrodes 20 face each other to form a capacitance. The capacitance forming portion 5 overlaps each of the plurality of first electrodes 10 and each of the plurality of second electrodes 20 when viewed in the first direction D1. The margin portion 6 is a portion of the element body 2 other than the capacitance forming portion 5.

The following expressions (1) to (4) are satisfied for each of the first electrodes 10 other than the first electrode 10A and each of the second electrodes 20 other than the second electrode 20A.

$$0.03 \leq L1/L0 \leq 0.1 \tag{1}$$

$$0.1 \leq L2/L0 \leq 0.25 \tag{2}$$

$$0.75 \leq L3/L0 \leq 0.9 \tag{3}$$

$$0.9 \leq L4/L0 \leq 0.97 \tag{4}$$

In the above expressions, L0 is a length (maximum length) of the element body 2 in the second direction D2. L1 is a distance between the first side surface 2b and the first curve-start points P1 in the second direction D2. L2 is a distance between the first side surface 2b and the second curve-start points P2 in the second direction D2. L3 is a distance between the first side surface 2b and the third curve-start points P3 in the second direction D2. L4 is a distance between the first side surface 2b and the fourth curve-start points P4 in the second direction D2.

Further, the following expressions (5) and (6) are satisfied for a distance between the pair of main surfaces 2a.

$$0 \leq (TL1-TL2)/TL1 \leq 0.02 \qquad (5)$$

$$0 \leq (TL1-TL3)/TL1 \leq 0.02 \qquad (6)$$

In the above expressions, TL1 is a distance between the main surfaces 2a on a straight line that is parallel to the first direction D1 and passes through a center of the element body 2 in the second direction D2. TL2 is a distance between the main surfaces 2a on a straight line that is parallel to the first direction D1 and passes through the second curve-start points P2. TL3 is a distance between the main surfaces 2a on a straight line that is parallel to the first direction D1 and passes through the third curve-start points P3. (TL1−TL2)/TL1 and (TL1−TL3)/TL1 represent degrees of flatness of the main surfaces 2a in the cross-section of FIG. 1. The main surfaces 2a may have a slightly curved shape such that a central portion thereof protrudes.

When a pair of electrodes located on the outermost sides in the first direction D1 among the plurality of first electrodes 10 and the plurality of second electrodes 20 are defined as outermost electrodes, in this example, a first electrode 10B closest to one main surface 2a among the plurality of first electrodes 10 and a second electrode 20B closest to the other main surface 2a among the plurality of second electrodes 20 are the outermost electrodes. The following expression (7) is satisfied for these outermost electrodes.

$$0.75 \leq T2/T1 \leq 0.94 \qquad (7)$$

In the above expression, T1 is a distance between main body portions of the pair of outermost electrodes in the first direction D1, and in this example, is a distance between the first main body portion 11 of the first electrode 10B and the second main body portion 21 of the second electrode 20B in the first direction D1. T2 is a distance between extending portions of the pair of outermost electrodes in the first direction D1, and in this example, is a distance between the first extending portion 12 of the first electrode 10B and the second extending portion 22 of the second electrode 20B in the first direction D1.

Shapes of the first electrodes 10 and the second electrodes 20 in the cross-section of FIG. 2 will be described with reference to FIG. 2. The element body 2 has a uniform cross-sectional shape in the second direction D2.

Each of the first electrodes 10 further has a third extending portion 14 and a fourth extending portion 15. The third extending portion 14 extends from the first main body portion 11 toward the third side surface 2d. The fourth extending portion 15 extends from the first main body portion 11 to a side opposite to the third extending portion 14 toward the fourth side surface 2e. The third extending portion 14 and the fourth extending portion 15 are not exposed on an outer surface of the element body 2.

Each of the first electrodes 10 other than the first electrode 10A located at the center in the first direction D1 among the plurality of first electrodes 10 is curved at a boundary part between the first main body portion 11 and the third extending portion 14 and at a boundary part between the first main body portion 11 and the fourth extending portion 15 such that the first main body portion 11 is located on an outer side of the third extending portion 14 and the fourth extending portion 15 in the first direction D1. In other words, each of the first electrodes 10 is curved such that the third extending portion 14 and the fourth extending portion 15 are located on an inner side of the first main body portion 11 in the first direction D1.

Each of the first electrodes 10 other than the first electrode 10A is curved as described above and thus has a fifth curve-start point P5 and a sixth curve-start point P6. The fifth curve-start point P5 is an curve-start point located at the boundary part between the first main body portion 11 and the third extending portion 14, and the sixth curve-start point P6 is an curve-start point located at the boundary part between the first main body portion 11 and the fourth extending portion 15.

The following expressions (8) and (9) are satisfied for each of the first electrodes 10 other than the first electrode 10A.

$$0 \leq W1/W0 \leq 0.25 \qquad (8)$$

$$0.75 \leq W2/W0 \leq 1 \qquad (9)$$

In the above expressions, W0 is a length (maximum length) of the element body 2 in the third direction D3. W1 is a distance between the third side surface 2d and the fifth curve-start point P5 in the third direction D3. W2 is a distance between the third side surface 2d and the sixth curve-start point P6 in the third direction D3.

Further, the following expressions (10) and (11) are satisfied for the distance between the pair of main surfaces 2a.

$$0 \leq (TW1-TW2)/TW1 \leq 0.02 \qquad (10)$$

$$0 \leq (TW1-TW3)/TW1 \leq 0.02 \qquad (11)$$

In the above expressions, TW1 is a distance between the main surfaces 2a on a straight line that is parallel to the first direction D1 and passes through a center of the element body 2 in the third direction D3. TW2 is a distance between the main surfaces 2a on a straight line that is parallel to the first direction D1 and passes through the fifth curve-start point P5. TW3 is a distance between the main surfaces 2a on a straight line that is parallel to the first direction D1 and passes through the sixth curve-start point P6. (TW1−TW2)/TW1 and (TW1−TW3)/TW1 represent degrees of flatness of the main surfaces 2a in the cross-section of FIG. 2.

Each of the second electrodes 20 further has a fifth extending portion 24 and a sixth extending portion 25. The fifth extending portion 24 extends from the second main body portion 21 toward the third side surface 2d. The sixth extending portion 25 extends from the second main body portion 21 to a side opposite to the fifth extending portion 24 toward the fourth side surface 2e. The fifth extending portion 24 and the sixth extending portion 25 are not exposed on an outer surface of the element body 2.

Each of the second electrodes 20 other than the second electrode 20A located at the center in the first direction D1 among the plurality of second electrodes 20 is curved at a boundary part between the second main body portion 21 and the fifth extending portion 24 and at a boundary part between the second main body portion 21 and the sixth extending portion 25 such that the second main body portion 21 is located on an outer side of the fifth extending portion 24 and the sixth extending portion 25 in the first direction D1. In other words, each of the second electrodes 20 is curved such that the fifth extending portion 24 and the sixth extending portion 25 are located on an inner side of the second main body portion 21 in the first direction D1. The boundary parts between the second main body portions 21 and the fifth extending portions 24 overlap the boundary parts between the first main body portions 11 and the third extending portions 14 in the first electrodes 10 in the first direction D1. The boundary parts between the second main body portions 21 and the sixth extending portions 25 overlap the boundary parts between the first main body portions 11 and the fourth extending portions 15 in the first electrodes 10 in the first direction D1.

Each of the second electrodes 20 other than the second electrode 20A is curved as described above and thus has a seventh curve-start point P7 and an eighth curve-start point P8. The seventh curve-start point P7 is an curve-start point located at a boundary part between the second main body portion 21 and the fifth extending portion 24, and the second curve-start point P2 is an curve-start point located at a boundary part between the second main body portion 21 and the sixth extending portion 25. In this example, positions of the seventh curve-start points P7 in the third direction D3 coincide with positions of the fifth curve-start points P5 of the first electrodes 10, and positions of the eighth curve-start points P8 in the third direction D3 coincide with positions of the sixth curve-start points P6 of the first electrodes 10.

Figure 3A:
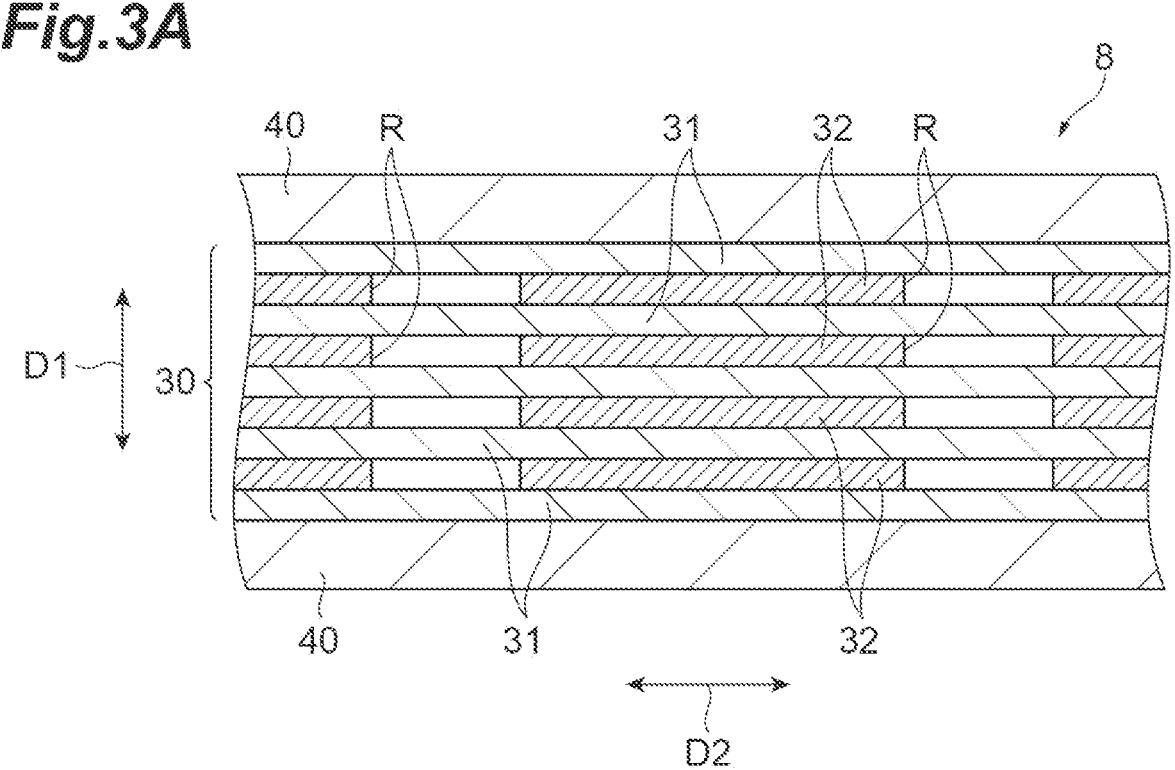
FIGS. 3A and 3B are diagrams for illustrating a method for manufacturing a multilayer capacitor.

A method for manufacturing the multilayer capacitor 1 will be described with reference to FIGS. 3A and 3B. As shown in FIG. 3A, a laminate 8 including an inner laminate 30 and a pair of outer laminates 40 sandwiching the inner laminate 30 in the first direction D1 is prepared. The inner laminate 30 includes a plurality of alternately laminated green sheets 31 and a plurality of conductive layers 32. The green sheets 31 are ceramic members serving as the dielectric layers 3 after firing. The conductive layers 32 are members serving as the first electrodes 10 or the second electrodes 20 after firing, and are, for example, conductive pastes. Each of the outer laminates 40 is a laminate including a plurality of green sheets. The green sheet constituting the outer laminates 40 have a lower elastic modulus than the green sheet 31 constituting the inner laminate 30. For example, the elastic modulus of the green sheet constituting the outer laminates 40 is equal to or less than 0.5 times of the elastic modulus of the green sheet 31 constituting the inner laminate 30.

Figure 3B:
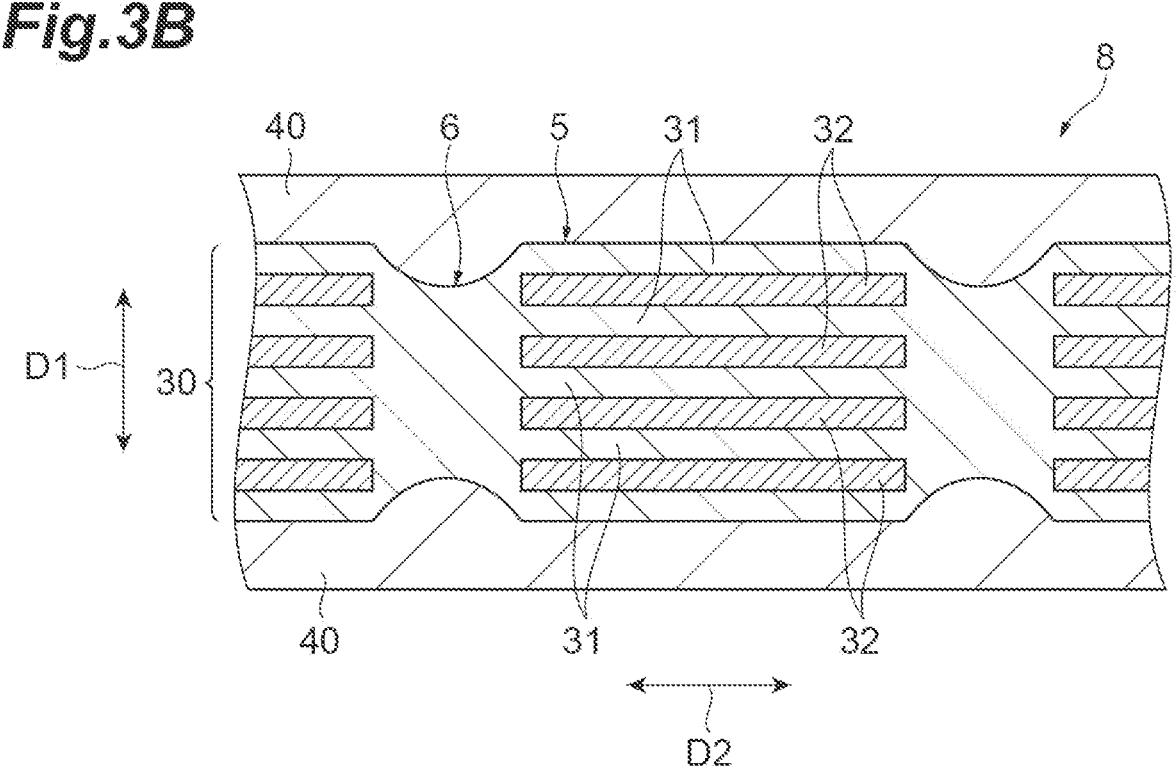

Subsequently, as shown in FIG. 3B, the laminate 8 is pressurized in the first direction D1. In this pressurizing step (a press molding step), since the elastic modulus of the green sheets constituting the outer laminates 40 is lower than that of the green sheets 31 constituting the inner laminate 30, the green sheets constituting the outer laminates 40 flows more than the green sheets 31 and enters inward in the first direction D1. Thus, deformation of the capacitance forming portion 5 in the pressurizing step is inhibited, and an interlayer adhesion strength in the margin portion 6 adjacent to the capacitance forming portion 5 is increased. Subsequently, the laminate 8 is cut to obtain a plurality of chips having a predetermined size. By firing these chips, the element body 2 is obtained. After that, the multilayer capacitor 1 is obtained through a step of providing an external electrode on the outer surface of the element body 2.

FUNCTIONS AND EFFECTS

In the multilayer capacitor 1, in the cross-section of FIG. 1, the first electrodes 10 other than the first electrode 10A are curved such that the first main body portion 11 is located on the outer side of the first extending portion 12 in the first direction D1, and the second electrodes 20 other than the second electrode 20A are curved such that the second main body portion 21 is located on the outer side of the second extending portion 22 in the first direction D1. In addition, the above expressions (1) to (4) are satisfied for the first curve-start point P1, the second curve-start point P2, the third curve-start point P3, and the fourth curve-start point P4. In the multilayer capacitor 1 configured in this way, deformation of the capacitance forming portion 5 in the pressurizing step during manufacturing is inhibited, and the interlayer adhesion strength in the margin portion 6 adjacent to the capacitance forming portion 5 is increased, and as a result, occurrence of structural defects can be inhibited. That is, in the case of adopting the configuration in which the first electrodes 10 are led out to the first side surface 2b and the second electrodes 20 are led out to the second side surface 2c as in the multilayer capacitor 1, the capacitance forming portion may be deformed due to the margin portion being crushed larger than the capacity forming portion in the pressurizing step during manufacturing. This is because there are margin regions (regions R in FIG. 3A) in which the green sheets are not disposed in the margin portion before the pressurizing step. If the deformation of the capacitance forming portion is large, structural defects such as delamination may occur. In contrast, in the multilayer capacitor 1, as described above, the deformation of the capacitance forming portion 5 is inhibited and the interlayer adhesion strength in the margin portion 6 is increased, and as a result, the occurrence of structural defects is inhibited. In addition, in the multilayer capacitor 1, the size of the capacitance forming portion 5 can be secured to be large, and thus an increase in capacity can be achieved. Further, in the multilayer capacitor 1, the above expressions (5) and (6) are satisfied for the distance between the main surfaces 2a in the cross-section of FIG. 1. Thus, the main surfaces 2a can be flattened, and occurrence of mounting defects can be inhibited. That is, if flatness of the main surfaces 2a is low, suction failure may occur in a case in which the main surface 2a is sucked and picked up by a suction nozzle when mounting. In addition, in a case in which the multilayer capacitor 1 is soldered to a mounting target at the main surface 2a, if a distance between the mounting target and the main surface 2a is short, flux residue of solder is likely to remain, and ion migration is likely to occur. For this reason, for example, it is necessary to make the external electrode thicker in order to secure the distance. In contrast, in the multilayer capacitor 1, since the main surfaces 2a are flattened, it is possible to inhibit occurrence of such mounting defects. Accordingly, according to the multilayer capacitor 1, it is possible to inhibit occurrence of structural defects, increase the capacity, and inhibit occurrence of mounting defects.

The first electrodes 10 other than the first electrode 10A are curved such that the first main body portion 11 is located on the outer side of the first portion 13 in the first direction D1, and the second electrodes 20 other than the second electrode 20A are curved such that the second main body portion 21 is located on the outer side of the second portion 23 in the first direction D1. Thus, the occurrence of structural defects can be further inhibited.

The above expression (7) is satisfied for the pair of outermost electrodes located on the outermost side in the first direction D1 among the plurality of first electrodes 10 and the plurality of second electrodes 20. Thus, the occurrence of structural defects can be further inhibited. That is, the above-mentioned functions and effects that "the deformation of the capacitance forming portion 5 in the pressurizing step at the time of manufacturing is inhibited, the interlayer adhesion strength in the margin portion 6 adjacent to the capacitance forming portion 5 is increased, and as a result, the occurrence of structural defects can be inhibited." is remarkably exhibited.

In the cross-section of FIG. 2, the first electrodes 10 other than the first electrode 10A are curved such that the first main body portion 11 is located on the outer side of the third extending portion 14 and the fourth extending portion 15 in the first direction D1, and the above expressions (8) and (9) are satisfied for the fifth curve-start point P5 and the sixth curve-start point P6. Thus, it is possible to further increase the capacity while the occurrence of structural defects are further inhibited.

The above expressions (10) and (11) are satisfied for the distance between the main surfaces 2a in the cross-section of FIG. 2. Thus, it is possible to further inhibit the occurrence of mounting defects.

The present disclosure is not limited to the above embodiment. For example, in the above embodiment, each of the first electrodes 10 other than the first electrode 10A and each of the second electrodes 20 other than the second electrode 20A are satisfied with the above expressions (1) to (4), but the above expressions (1) to (4) may be satisfied for at least one of the plurality of first electrodes 10 and at least one of the plurality of second electrodes 20. For example, all of the first electrodes 10 and all of the second electrodes 20 may satisfy the above expressions (1) to (4). In the above embodiment, the first electrode 10B and the second electrode 20B are the outermost electrodes, but both of the outermost electrodes may be the first electrodes 10, and both of the outermost electrodes may be the second electrodes 20.

What is claimed is:

1. A multilayer capacitor comprising an element body including a pair of main surfaces facing each other in a first direction, and a first side surface and a second side surface facing each other in a second direction perpendicular to the first direction,
wherein the element body includes a plurality of first electrodes and a plurality of second electrodes disposed alternately to face each other via a dielectric layer in the first direction,
each of the plurality of first electrodes includes a first main body portion and a first extending portion extending from the first main body portion to reach the first side surface,
each of the plurality of second electrodes includes a second main body portion and a second extending portion extending from the second main body portion to reach the second side surface,
in a cross-section parallel to the first direction and the second direction, at least one of the plurality of first electrodes is curved such that the first main body portion is located on an outer side of the first extending portion in the first direction and the at least one of the plurality of first electrodes includes a first curve-start point closest to the first side surface and a second curve-start point second closest to the first side surface after the first curve-start point,
at least one of the plurality of second electrodes is curved such that the second main body portion is located on an outer side of the second extending portion in the first direction and the at least one of the plurality of second electrodes includes a fourth curve-start point closest to the second side surface and a third curve-start point second closest to the second side surface after the fourth curve-start point,
when a length of the element body in the second direction is defined as L0, a distance between the first side surface and the first curve-start point in the second direction is defined as L1, a distance between the first side surface and the second curve-start point in the second direction is defined as L2, a distance between the first side surface and the third curve-start point in the second direction is defined as L3, a distance between the first side surface and the fourth curve-start point in the second direction is defined as L4, a distance between the pair of main surfaces on a straight line that is parallel to the first direction and passes through a center of the element body in the second direction is defined as TL1, a distance between the pair of main surfaces on a straight line that is parallel to the first direction and passes through the second curve-start point is defined as TL2, and a distance between the pair of main surfaces on a straight line that is parallel to the first direction and passes through the third curve-start point is defined as TL3,
the following expressions (1) to (6) are satisfied:

$$0.03 \leq L1/L0 \leq 0.1 \quad (1)$$

$$0.1 \leq L2/L0 \leq 0.25 \quad (2)$$

$$0.75 \leq L3/L0 \leq 0.9 \quad (3)$$

$$0.9 \leq L4/L0 \leq 0.97 \quad (4)$$

$$0 \leq (TL1-TL2)/TL1 \leq 0.02 \quad (5)$$

$$0 \leq (TL1-TL3)/TL1 \leq 0.02 \quad (6).$$

2. The multilayer capacitor according to claim 1,
wherein the at least one of the plurality of first electrodes further includes a first portion extending from the first main body portion to a side opposite to the first extending portion and is curved such that the first main body portion is located on an outer side of the first portion in the first direction, and
the at least one of the plurality of second electrodes further includes a second portion extending from the second main body portion to a side opposite to the second extending portion and is curved such that the second main body portion is located on an outer side of the second portion in the first direction.

3. The multilayer capacitor according to claim 1,
wherein each of a pair of outermost electrodes located on the outermost side in the first direction among the plurality of first electrodes and the plurality of second electrodes includes a main body portion, and an extending portion extending from the main body portion to reach the first side surface or the second side surface, and
when a distance between the main body portions of the pair of outermost electrodes in the first direction is defined as T1, and a distance between the extending portions of the pair of outermost electrodes in the first direction is defined as T2,
the following expression (7) is satisfied:

$$0.75 \leq T2/T1 \leq 0.94 \quad (7).$$

4. The multilayer capacitor according to claim 1,
wherein the element body further includes a third side surface and a fourth side surface facing each other in a third direction perpendicular to the first direction and the second direction,
each of the plurality of first electrodes further includes a third extending portion extending from the first main body portion toward the third side surface, and a fourth extending portion extending from the first main body portion toward the fourth side surface, in a cross-section perpendicular to the second direction, at least one of the plurality of first electrodes is curved such that the first main body portion is located on an outer side of the third extending portion and the fourth extending portion in the first direction and the at least one of the plurality of first electrodes includes a fifth curve-start point located at a boundary part between the first main body portion and the third extending portion, and a sixth curve-start point located at a boundary part between the first main body portion and the fourth extending portion, and when a length of the element body in the third direction is defined as W0, a distance between the third side surface and the fifth curve-start point in the third direction is defined as W1, and a distance between the third side surface and the sixth curve-start point in the third direction is defined as W2, the following expressions (8) and (9) is satisfied:

$$0 \leq W1/W0 \leq 0.25 \tag{8}$$

$$0.75 \leq W2/W0 \leq 1 \tag{9}.$$

5. The multilayer capacitor according to claim 4,
wherein, in the cross-section perpendicular to the second direction, when a distance between the pair of main surfaces on a straight line that is parallel to the first direction and passes through a center of the element body in the third direction is defined as TW1, a distance between the pair of main surfaces on a straight line that is parallel to the first direction and passes through the fifth curve-start point is defined as TW2, and a distance between the pair of main surfaces on a straight line that is parallel to the first direction and passes through the sixth curve-start point is defined as TW3, the following expressions (10) and (11) are satisfied:

$$0 \leq (TW1-TW2)/TW1 \leq 0.02 \tag{10}$$

$$0 \leq (TW1-TW3)/TW1 \leq 0.02 \tag{11}.$$

* * * * *